US012795614B2

(12) United States Patent
He et al.

(10) Patent No.: US 12,795,614 B2
(45) Date of Patent: Nov. 10, 2026

(54) CHANNEL TRANSMISSION METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventors: Chuanfeng He, Dongguan (CN); Shengjiang Cui, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 230 days.

(21) Appl. No.: 18/236,112

(22) Filed: Aug. 21, 2023

(65) Prior Publication Data

US 2023/0403683 A1 Dec. 14, 2023

Related U.S. Application Data

(63) Continuation of application No. PCT/CN2021/085234, filed on Apr. 2, 2021.

(51) Int. Cl.
*H04W 72/04* (2023.01)
*H04L 25/02* (2006.01)

(52) U.S. Cl.
CPC ......... *H04W 72/04* (2013.01); *H04L 25/0204* (2013.01)

(58) Field of Classification Search
CPC .. H04W 72/04; H04W 72/12; H04L 25/0204; H04L 1/08
See application file for complete search history.

(56) References Cited

U.S. PATENT DOCUMENTS

2020/0344015 A1 10/2020 Zhu
2021/0219278 A1* 7/2021 Hu ........................ H04L 5/0094
2024/0163011 A1* 5/2024 Hasegawa ............ H04L 1/0071

FOREIGN PATENT DOCUMENTS

| | | | |
|---|---|---|---|
| CN | 108521884 | A | 9/2018 |
| CN | 110719155 | A | 1/2020 |
| CN | 110972303 | A | 4/2020 |
| CN | 111836376 | A | 10/2020 |
| WO | 2020032637 | A1 | 2/2020 |

OTHER PUBLICATIONS

International Search Report in the international application No. PCT/CN2021/085234, mailed on Dec. 29, 2021. 5 pages with English translation.

(Continued)

*Primary Examiner* — Derrick W Ferris
*Assistant Examiner* — M Mostazir Rahman
(74) *Attorney, Agent, or Firm* — BAYES PLLC

(57) ABSTRACT

A channel transmission method includes: a terminal device determining a target time-frequency resource on the basis of first time-frequency resources for channel transmission and a second time-frequency resource indicated by first indication information; a channel transmission on the target time-frequency resource being cancelled, and the first time-frequency resources comprising time-frequency resources corresponding to a joint channel estimation and/or time-frequency resources corresponding to a transport block transmission over multiple slots.

14 Claims, 6 Drawing Sheets

(56) References Cited

OTHER PUBLICATIONS

English translation of the Written Opinion of the International Search Authority in the international application No. PCT/CN2021/085234, mailed on Dec. 29, 2021. 8 pages with English translation.
Intel Corporation, "Discussion on TB Processing Over Multi-slot PUSCH" R1-2100666, 3GPP TSG RAN WG1 #104-e, Jan. 19, 2021 (Jan. 19, 2021). 6 pages.
"3rd Generation Partnership Project; Technical Specification Group Radio Access Network; NR; Physical layer procedures for control (Release 16)", 3GPP TS 38.213 V16.2.0 (Jun. 2020). 176 pages.
"3rd Generation Partnership Project; Technical Specification Group Radio Access Network; NR; Physical layer procedures for data (Release 16)", 3GPP TS 38.214 V16.2.0 (Jun. 2020). 163 pages.
First Office Action of the European application No. 21934069.2, issued on Oct. 1, 2024. 6 pages.
OPPO: "Type A PUSCH repetitions for Msg3", 3GPP Draft; R1-2100176, 3rd Generation Partnership Project (3GPP), Mobile Competence Centre; 650, Route Des Lucioles; F-06921 Sophia-Antipolis Cedex; France, vol. RAN WG1, No. e-Meeting; Jan. 25, 2021-Feb. 5, 2021, Jan. 18, 2021 (Jan. 18, 2021), XP051970294, paragraph [0002]. 4 pages.
Supplementary European Search Report in the European application No. 21934069.2, mailed on Dec. 13, 2023. 9 pages.
Supplementary European Search Report in the European application No. 25213238.6, mailed on Dec. 19, 2025.
Moderators (AT&T, NTT DOCOMO, INC.), "Updated RAN1 UE features list for Rel-16 NR after RAN1#104-e", 3GPP TSG RAN WG1 #104-e, R1-2102006, e-Meeting, Jan. 25-Feb. 5, 2021, pp. 1-6.
First Office Action of the Chinese application No. 202511126470.7, issued on Aug. 28, 2026.

* cited by examiner

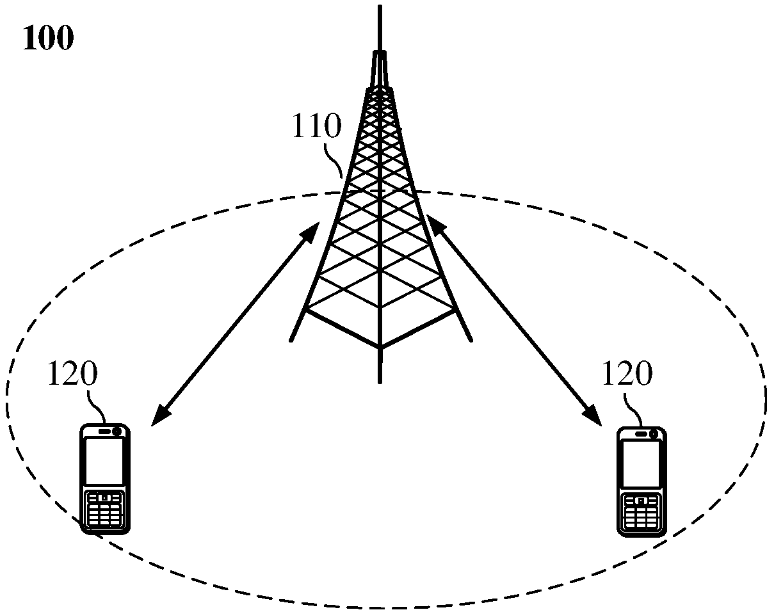

FIG. 3

A terminal device determines a target time-frequency resource based on first time-frequency resources for channel transmission and a second time-frequency resource indicated by first indication information; a channel transmission on the target time-frequency resource is cancelled, and the first time-frequency resources include time-frequency resources corresponding to a joint channel estimation and/or time-frequency resources corresponding to a transport block transmission over multiple slots

S201

FIG. 4

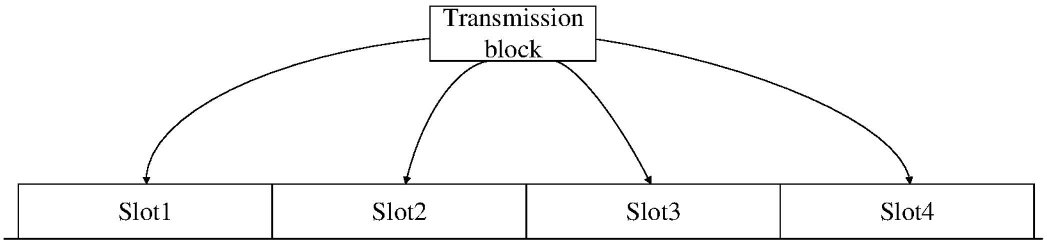

FIG. 5

CHANNEL TRANSMISSION METHOD, ELECTRONIC DEVICE, AND STORAGE MEDIUM

CROSS-REFERENCE TO RELATED APPLICATION

This application is a continuation of International Application No. PCT/CN2021/085234 filed on Apr. 2, 2021, the disclosure of which is hereby incorporated by reference in its entirety.

BACKGROUND

In a New Radio (NR) system, in order to improve coverage enhancement of uplink transmission, a multi-slot uplink transmission mode is used. However, how to perform multi-slot uplink transmission has not been defined when time-domain resources for the multi-slot uplink transmission conflict with time-domain resources for transmission of other services.

SUMMARY

The disclosure relates to the technical field of wireless communication. Embodiments of the disclosure provide a channel transmission method, an electronic device, and a storage medium, which specify time-domain resources for multi-slot uplink transmission (uplink transmission over multiple slots) when time-domain resources for the multi-slot uplink transmission conflict with time-domain resources for transmission of other services.

According to a first aspect, an embodiment of the disclosure provides a channel transmission method, including the following operations. A terminal device determines a target time-frequency resource based on first time-frequency resources for channel transmission and a second time-frequency resource indicated by first indication information. The channel transmission on the target time-frequency resource is cancelled, and the first time-frequency resources include time-frequency resources corresponding to a joint channel estimation and/or time-frequency resources corresponding to a transport block transmission over multiple slots.

According to a second aspect, an embodiment of the disclosure provides a channel transmission method, including the following operations. A network device transmits first indication information to a terminal device.

A second time-frequency resource indicated by the first indication information and first time-frequency resources for channel transmission are used to determine a target time-frequency resource. The channel transmission on the target time-frequency resource is cancelled, and the first time-frequency resources include time-frequency resources corresponding to a joint channel estimation and/or time-frequency resources corresponding to a transport block transmission over multiple slots.

According to a third aspect, an embodiment of the disclosure provides a terminal device. The terminal device includes a processing unit, configured to determine a target time-frequency resource based on first time-frequency resources for channel transmission and a second time-frequency resource indicated by first indication information. The channel transmission on the target time-frequency resource is cancelled, and the first time-frequency resources include time-frequency resources corresponding to a joint channel estimation and/or time-frequency resources corresponding to a transport block transmission over multiple slots.

According to a fourth aspect, an embodiment of the disclosure provides a network device. The network device includes a transmission unit, configured to transmit first indication information to a terminal device.

A second time-frequency resource indicated by the first indication information and first time-frequency resources for channel transmission are used to determine a target time-frequency resource; the channel transmission on the target time-frequency resource is cancelled, and the first time-frequency resources include time-frequency resources corresponding to a joint channel estimation and/or time-frequency resources corresponding to a transport block transmission over multiple slots.

According to a fifth aspect, an embodiment of the disclosure provides a terminal device, including a processor and a memory configured to store a computer program executable on the processor. The processor is configured to run the computer program to execute operations of the above channel transmission method executed by the terminal device.

According to a sixth aspect, an embodiment of the disclosure provides a network device, including a processor and a memory configured to store a computer program executable on the processor. The processor is configured to run the computer program to execute operations of the above channel transmission method executed by the network device.

According to a seventh aspect, an embodiment of the disclosure provides a chip. The chip includes a processor, configured to call and run a computer program from a memory, to enable a device installed with the chip to execute the above channel transmission method executed by the terminal device.

According to an eighth aspect, an embodiment of the disclosure provides a chip. The chip includes a processor, configured to call and run a computer program from a memory, to enable a device installed with the chip to execute the above channel transmission method executed by the network device.

According to a ninth aspect, an embodiment of the disclosure provides a storage medium, having stored thereon an executable program. The executable program, when executed by a processor, implements the above channel transmission method executed by the terminal device.

According to a tenth aspect, an embodiment of the disclosure provides a storage medium, having stored thereon an executable program. The executable program, when executed by a processor, implements the above channel transmission method executed by the network device.

According to an eleventh aspect, an embodiment of the disclosure provides a computer program product, including computer program instructions. The computer program instructions enable a computer to execute the above channel transmission method executed by the terminal device.

According to a twelfth aspect, an embodiment of the disclosure provides a computer program product, including computer program instructions. The computer program instructions enable a computer to execute the above channel transmission method executed by the network device.

According to a thirteenth aspect, an embodiment of the disclosure provides a computer program. The computer program enables a computer to execute the above channel transmission method executed by the terminal device.

According to a fourteenth aspect, an embodiment of the disclosure provides a computer program. The computer program enables a computer to execute the above channel transmission method executed by the network device.

BRIEF DESCRIPTION OF THE DRAWINGS

FIG. 3 is a schematic structural diagram of composition of a communication system according to an embodiment of the disclosure.

FIG. 4 is an optional processing flowchart of a channel transmission method according to an embodiment of the disclosure.

FIG. 5 is a schematic diagram of Transmission block over Multi-slot (TBoMS) transmission according to an embodiment of the disclosure.

DETAILED DESCRIPTION

Figure 1:
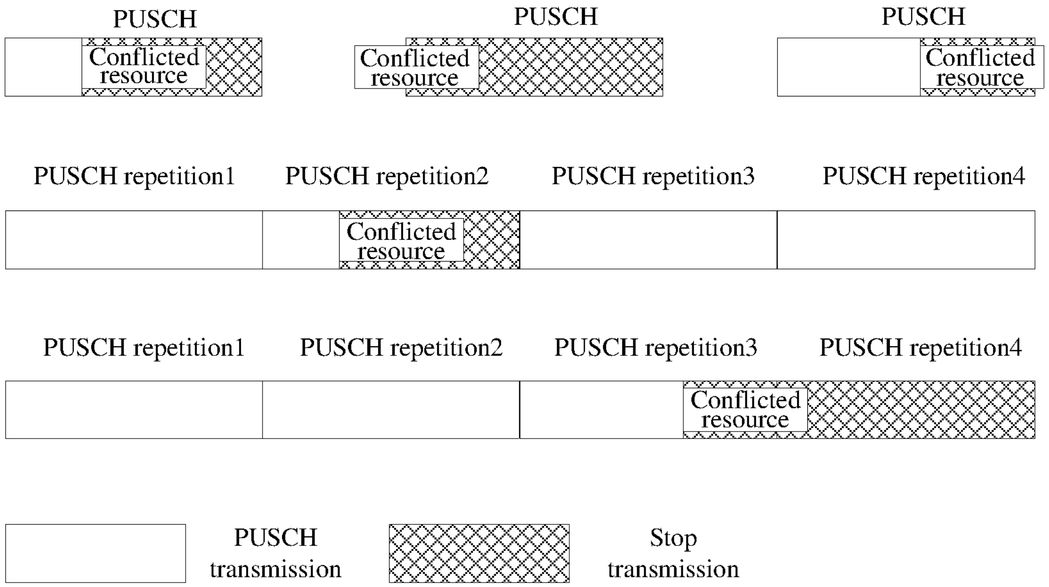
FIG. 1 is a schematic diagram of a relationship between conflicted time-frequency resources indicated by an uplink cancelation indication (UL CI) and a cancelled Physical Uplink Shared Channel (PUSCH) transmission according to an embodiment of the disclosure.

In order to understand features and technical contents of embodiments of the disclosure in more detail, implementations of the embodiments of the disclosure will be described in detail below with reference to the drawings. The drawings are provided for reference and explanation only and are not intended to limit the embodiments of the disclosure.

Before the embodiments of the disclosure are described, related contents are briefly described.

In an NR system, a network device transmits an Uplink grant (UL grant) to a terminal device through Downlink Control Information (DCI) format 0_0 or DCI format 0_1, and the UL grant is used to schedule a Physical Uplink Shared Channel (PUSCH) transmission.

When the network device schedules uplink data transmission through DCI of the UL grant, an information domain TimeDomainResourceAllocation (TDRA) is carried in the DCI. The information domain TDRA may have a size of 4 bits that are used to indicate 16 different rows in a resource allocation table. Each row includes different resource allocation combinations, such as a starting position S, length L, $K_2$ of a PUSCH, and different PUSCH time domain resource allocation types. $K_2$ represents a number of offset slots between a slot where the DCI is located and a slot where the PUSCH scheduled by the DCI is located. The PUSCH time domain resource allocation types include Type A and Type B. Ranges of candidate values of S corresponding to Type A and Type B are different, and ranges of candidate values of L corresponding to Type A and Type B are also different. Type A is mainly directed to a slot-based service, S is relatively at the front, and L is relatively long. Type B is mainly directed to a Ultra Reliable and Low Latency Communication (URLLC) service, and because the URLLC service has a relatively high latency requirement, a position of S is relatively flexible, so that the transmission distance L is relatively short, thereby reducing transmission latency. Optional value ranges of S and L are illustrated in Table 1 below.

TABLE 1

| Valid S and L combinations | | | | | | |
|---|---|---|---|---|---|---|
| PUSCH mapping | Normal cyclic prefix | | | Extended cyclic prefix | | |
| type | S | L | S + L | S | L | S + L |
| Type A | 0 | {4, . . . , 14} | {4, . . . , 14} (repetition Type A only) | 0 | {4, . . . , 12} | {4, . . . , 12} |
| Type B | {0, . . . , 13} | {1, . . . , 14} | {1, . . . , 14} for repetition Type A, {1, . . . , 27} for repetition Type B | {0, . . . , 11} | {1, . . . , 12} | {1, . . . , 12} |

A PUSCH time domain resource allocation table for the normal cyclic prefix (CP) is illustrated in Table 2 below. The network device indicates time domain resource allocation information in the table to the terminal device through DCI.

TABLE 2

| PUSCH time domain resource allocation table A for normal CP | | | | |
|---|---|---|---|---|
| Row index | PUSCH mapping type | $K_2$ | S | L |
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

Frequency domain resource allocation modes of PUSCH may include two types, i.e., Type 0 and Type 1. The frequency domain resource allocation modes of the PUSCH may be configured by high-level signaling, or may be dynamically indicated by DCI. The frequency domain resource allocation mode Type 0 may indicate, by a bitmap, a Resource Block Group (RBG) allocated to the terminal device, and a number of Resource Blocks (RBs) included in the RBG is related to high-level parameter configurations (Configuration 1 and Configuration 2) and a Bandwidth Part (BWP) size. A normal RBG size P may be illustrated in Table 3 below.

TABLE 3

| Normal RBG size P | | |
|---|---|---|
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

The frequency domain resource allocation mode Type 1 forms a value, i.e., Resource Indication Value (RIV) by jointly encoding a starting position (S) and a length (L) of resources. A group (S, L) corresponds to a RIV value, and the terminal device may determine the corresponding (S, L) through the RIV value. S represents a position of a virtual RB, and L represents a number of consecutive RBs allocated by the network device to the terminal device.

In the NR system, in order to support the URLLC service, repetition transmission of uplink data transmission is used to improve reliability of the transmission. PUSCH repetition transmission may include two types, i.e., PUSCH repetition Type A and PUSCH repetition Type B. The type of the PUSCH repetition transmission may be determined by high-level signaling. PUSCH time domain resource allocation modes for the PUSCH repetition Type A and the PUSCH repetition Type B are different. Specifically, for the PUSCH repetition Type A, a starting symbol S of the PUSCH and a number L of consecutive symbols starting from the symbol S are determined by SLIV indicated in a Physical Downlink Control Channel (PDCCH); and for the PUSCH repetition Type B, a starting symbol S of the PUSCH and a number L of consecutive symbols starting from the symbol S are determined by a starting symbol (startSymbol) and length information corresponding to a row in the time domain resource allocation table, respectively.

Configuration information in the time domain resource allocation table is illustrated as follows:

```
PUSCH-TimeDomainResource AllocationNew information element
-- ASN1START
-- TAG-PUSCH-TIMEDOMAINRESOURCEALLOCATIONLISTNEW-START
PUSCH-TimeDomainResourceAllocationListNew-r16 ::= SEQUENCE
(SIZE(1..maxNrofUL-Allocations-r16)) OF
PUSCH-TimeDomainResourceAllocationNew-r16
PUSCH-TimeDomainResourceAllocationNew-r16 ::= SEQUENCE {
k2-r16 INTEGER (0..32) OPTIONAL, -- Need S
mappingType-r16 ENUMERATED {typeA, typeB} OPTIONAL, -- Cond
RepTypeA
startSymbolAndLength-r16 INTEGER (0..127) OPTIONAL, -- Cond RepTypeA
startSymbol-r16 INTEGER (0..13) OPTIONAL, -- Cond RepTypeB
length-r16 INTEGER (1..14) OPTIONAL, -- Cond RepTypeB
numberOfRepetitions-r16 ENUMERATED {n1, n2, n4, n7, n12, n16},
...
}
```

Each time domain resource allocation information includes a symbol where the PUSCH is located, and "numbereOfRepetitions" indicates a number K of retransmissions of the PUSCH. The terminal device determines, according to the time domain resource allocation information and the PUSCH repetition type determined by the high-level signaling, a time-domain resource where the retransmission of the PUSCH is located.

For the PUSCH repetition Type A, the terminal device transmits the same transmission block repeatedly in K consecutive slots. Symbol allocation in each slot is the same, i.e., symbol allocation in a slot indicated by startSymbolAndLength.

For the PUSCH repetition Type B, in an N-th PUSCH transmission, n=numberofrepetitions−1:

a slot where a starting position of the PUSCH transmission is located is $$K_s + \left\lfloor \frac{S + n \cdot L}{N_{symb}^{slot}} \right\rfloor,$$

and a starting symbol of the PUSCH relative to the starting position of the slot is $$\mathrm{mod}\left(S + n \cdot L,\ N_{symb}^{slot}\right);$$

and a slot where an end position of the PUSCH transmission is located is $$K_s + \left\lfloor \frac{S + (n+1) \cdot L - 1}{N_{symb}^{slot}} \right\rfloor,$$

and an end symbol of the PUSCH relative to the starting position of the slot is $$\mathrm{mod}\left(S + (n+1) \cdot L - 1,\ N_{symb}^{slot}\right);$$

$K_s$ is a slot where a starting position of the PUSCH repetition transmission is located, and $$N_{symb}^{slot}$$

is a number of symbols included in each slot.

That is, for the PUSCH repetition Type B, K transmissions of the PUSCH start at the symbol S of the slot $K_s$ and are transmitted on consecutive K×L symbols, and each transmission includes L symbols. The K transmissions are configuration-based nominal PUSCH repetition transmissions. A time-domain resource of a nominal PUSCH repetition transmission may include invalid symbols, such as a downlink symbol and an invalid symbol configured and indicated by a network; and an actual PUSCH transmission cannot include a downlink symbol and an invalid symbol, and an uplink symbol and a flexible symbol are valid symbols. After determining the valid symbols, the terminal device determines that when a number of consecutive valid symbols of one nominal PUSCH transmission in a slot is greater than 0, the nominal PUSCH transmission may map one actual PUSCH transmission. Time-domain resources of one nominal PUSCH transmission may include time-domain resources of one or more actual PUSCH transmissions. The terminal device does not transmit an actual PUSCH transmission of a single symbol, unless the single symbol is a number L of symbols of a nominal PUSCH transmission indicated by the network device; as an example, when only one valid symbol is included in one slot, and the network device does not indicate that the number of symbols of the nominal PUSCH transmission is 1, the terminal device does not transmit the actual PUSCH transmission in the slot.

When a URLLC service and an Enhanced Mobile Broadband (eMBB) service are concurrent in the NR system, multiplexing of uplink transmission resources between different terminal devices needs to be considered. To this end, an Uplink Cancelation Indication (UL CI) is introduced into a Release-16 (R16) standard, and when the URLLC service and the eMBB service are transmitted at the same time-frequency resource, the network device instructs the terminal device by the UL CI in advance to cancel transmission of the eMBB service on the time-frequency resource where the URLLC service is transmitted, so as to ensure that the time-frequency resource for transmission of the URLLC service is not interfered by transmission of the eMBB service, such that reliability of transmission of the URLLC service in a multiplexing scenario is improved. The UL CI may be carried by DCI format 2_4, and may be used to cancel resources of the PUSCH and a Sounding Reference Signal (SRS). After receiving the UL CI, a terminal device transmitting a non-URLLC service determines according to transmission information of the terminal device and information of conflicted resources indicated by the UL CI whether transmission needs to be cancelled and which type of transmission is cancelled. When the resource indicated by the UL CI conflicts with the transmission resource of the terminal device, the terminal device cancels the current transmission; otherwise, the terminal device does not cancel the current transmission. Considering complexity of recovering the uplink transmission by the terminal device, a range of cancelation transmission is from a starting point of the conflicted resource to an ending position of the current transmission, rather than merely cancelling transmission of resources where conflict occurs. In case of repetition transmission, cancelation transmission is performed on each actual repetition transmission independently; as an example, the terminal device includes N actual repetition transmissions, and when the second actual repetition transmission in the N actual repetition transmissions is cancelled, other actual repetition transmissions except the second actual repetition transmission are transmitted normally. FIG. 1 illustrates a schematic diagram of a relationship between conflicted time-frequency resources indicated by an UL CI and a cancelled PUSCH transmission, and when the PUSCH transmission and the URLLC service are transmitted on the same time-frequency resource (the PUSCH transmission and the URLLC service have a conflicted time-frequency resource), the terminal device cancels the PUSCH transmission from a starting point of the conflicted time-frequency resource to an ending position of the current PUSCH transmission.

In the related art, when a coverage-enhanced uplink transmission is used, if the uplink transmission resource conflicts with the transmission resource of the URLLC service, whether to cancel the uplink transmission and cancelation of which uplink transmissions have not been specified. Furthermore, in the related art, UL CI is only used to indicate cancelation of SRS transmission and PUSCH transmission, and cannot be used to indicate cancelation of Physical Uplink Control Channel (PUCCH) transmission and Physical Random Access Channel (PRACH)-related uplink transmission. When the coverage-enhanced uplink transmission is also used for the PUCCH transmission and the PRACH-related uplink transmission, and when at least one of the PUCCH transmission resource or the PRACH-related uplink transmission resource conflicts with the transmission resource of the URLLC service, whether to cancel the PUCCH transmission and/or the PRACH-related uplink transmission and cancelation of which PUCCH transmissions and/or PRACH-related uplink transmissions have not been specified.

Figure 2:
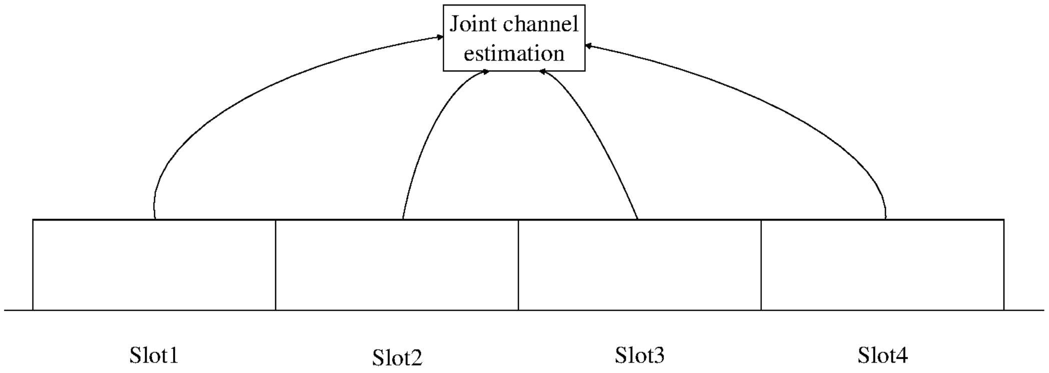
FIG. 2 is a schematic diagram of a joint channel estimation according to an embodiment of the disclosure.

In the related art, for the PUSCH repetition transmission, the network device performs channel estimation on each PUSCH transmission separately. In order to improve coverage performance of the PUSCH transmission, in the 3rd Generation Partnership Project (3GPP) R17 version, standardization of a joint channel estimation of the PUSCH repetition transmission is scheduled, and the network device performs the joint channel estimation according to Demodulation Reference Signals (DMRSs) in multiple PUSCH transmissions, to improve accuracy of the channel estimation. In case of the joint channel estimation, it is required to determine a number of slots for performing the joint channel estimation or a number of the PUSCH repetition transmissions, and in a range of a transmission time interval corresponding to the number of slots of the joint channel estimation or the number of the PUSCH repetition transmissions, the joint channel estimation by the network device assumes that the DMRSs are related; for example, power, antenna ports and pre-coding are unchanged, phases are continuous, or the like. Correspondingly, the terminal device also needs to ensure these assumptions related to the joint channel estimation in the PUSCH transmission; for example, power, antenna ports and pre-coding are unchanged, phases are continuous, or the like. Therefore, when the network device performs the joint channel estimation, PUSCHs of multiple slots are required to maintain power consistency and phase continuation. FIG. 2 illustrates a schematic diagram of a joint channel estimation, and when the number of the PUSCH repetition transmissions is four, or the PUSCH repetition transmission is performed in four slots, the network device performs the joint channel estimation based on the four slots.

Technical solutions of the embodiments of the disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced Long Term Evolution (LTE-A) system, an NR system, an evolutional system of the NR system, a LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next generation communication system, or other communication systems, or the like.

System architectures and service scenarios described in the embodiments of the disclosure are intended to explain the technical solutions of the embodiments of the disclosure more clearly, and do not constitute limitation to the technical solutions provided in the embodiments of the disclosure. It may be known by those of ordinary skill in the art that with evolution of network architectures and occurrence of new service scenarios, the technical solutions provided in the embodiments of the disclosure are also applicable to similar technical problems.

The network device involved in the embodiments of the disclosure may be a common base station (such as a NodeB or an evolutional NodeB (eNB) or a next generation NodeB (gNB)), a New Radio controller (NR controller), a centralized unit, an NR base station, a radio remote module, a micro base station, a relay, a distributed unit, a Transmission Reception Point (TRP), a Transmission Point (TP), or any other device. Specific technology used by the network device and specific device form are not limited in the embodiments of the disclosure. For ease of description, in all embodiments of the disclosure, devices providing wireless communication functions to the terminal device are collectively referred to as the network device.

In the embodiments of the disclosure, the terminal device may be any terminal, for example, the terminal device may be a User Equipment (UE) in a machine type communication. That is, the terminal device may also be referred to as a UE, a Mobile Station (MS), a mobile terminal, a terminal, or the like. The terminal device may communicate with one or more core networks via a Radio Access Network (RAN). For example, the terminal device may be a mobile phone (or referred to as a "cellular" phone), a computer provided with a mobile terminal, or the like. For example, the terminal device may also be a portable mobile device, a pocket-type mobile device, a handheld mobile device, a computer built-in mobile device, or a vehicle-mounted mobile device, which exchanges language and/or data with the RAN, which are not specifically limited in the embodiments of the disclosure.

In an example, the network device and the terminal device may be deployed on land, including indoor or outdoor, handheld or vehicle-mounted; or, may be deployed on a water surface; or, may also be deployed on an aircraft, a balloon and an artificial satellite in the air. The embodiments of the disclosure do not limit application scenarios of the network device and the terminal device.

In an example, communication between the network device and the terminal device and communication between the terminal devices may be performed by a licensed spectrum, or by a unlicensed spectrum, or by both the licensed spectrum and the unlicensed spectrum. Communication between the network device and the terminal device and communication between the terminal devices may be performed by a spectrum below 7 gigahertz (GHz), or by a spectrum above 7 GHz, or by both the spectrum below 7 GHz and the spectrum above 7 GHz. The embodiments of the disclosure do not limit spectrum resources used between the network device and the terminal device.

Generally, a traditional communication system supports a limited number of connections, and is also easy to be implemented; however, with the development of communication technologies, a mobile communication system not only supports traditional communication, but also supports such as device to device (D2D) communication, machine to machine (M2M) communication, machine type communication (MTC), vehicle to vehicle (V2V) communication, or the like. The embodiments of the disclosure may also be applied to these communication systems.

For example, a communication system 100 to which the embodiments of the disclosure are applied is illustrated in FIG. 3. The communication system 100 may include a network device 110, and the network device 110 may be a device in communication with a terminal device 120 (or referred to as a communication terminal or a terminal). The network device 110 may provide communication coverage for a specific geographic area, and may communicate with terminal devices located in the coverage area. In an example, the network device 110 may be a Base Transceiver Station (BTS) in a GSM system or a CDMA system, or a NodeB (NB) in a WCDMA system, or an evolutional Node B (eNB or eNodeB) in a LTE system, or a radio controller in a Cloud Radio Access Network (CRAN); or, the network device may be a mobile switching center, a relay station, an access point, a vehicle-mounted device, a wearable device, a hub, a switch, a bridge, a router, a network-side device in a 5th Generation (5G) network, or a network device in a future evolutional Public Land Mobile Network (PLMN), or the like.

The communication system 100 further includes at least one terminal device 120 located within a coverage range of the network device 110. The "terminal device" used herein includes, but is not limited to, connection via wired lines, such as connection via Public Switched Telephone Networks (PSTN), Digital Subscriber Line (DSL), digital cables, direct cables; and/or another data connection/network; and/or via a wireless interface, such as for a cellular network, a Wireless Local Area Network (WLAN), a digital television network such as DVB-H network, a satellite network, a AM-FM broadcast transmitter; and/or means of another terminal arranged to receive/transmit a communication signal; and/or an Internet of Things (IoT) device. A terminal device configured to communicate via a wireless interface may be referred to as a "wireless communication terminal", "wireless terminal" or "mobile terminal". Examples of mobile terminals include, but are not limited to, satellite or cellular telephones; a Personal Communications System (PCS) terminal that may combine a cellular radio telephone with data processing, fax and data communications capability; a Personal Digital Assistant (PDA) that may include a radio telephone, a pager, Internet/intranet access, a Web browser, memo pad, calendar and/or Global Positioning System (GPS) receiver; and a conventional laptop and/or palmtop receiver or other electronic devices including a radio telephone transceiver. The terminal device may be referred to an access terminal, a User Equipment (UE), a subscriber unit, a subscriber station, a mobile station, a mobile radio station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a 5G network, a terminal device in a future evolved PLMN or the like.

In an example, Device to Device (D2D) communication may be performed between the terminal devices 120.

In an example, a 5G system or a 5G network may also be referred to as an NR system or an NR network.

FIG. 3 exemplarily illustrates a network device and two terminal devices. In an example, the communication system 100 may include multiple network devices, and a coverage range of each of the network devices may include other numbers of terminal devices, which is not limited in the embodiments of the disclosure.

In an example, the communication system 100 may further include other network entities, such as a network controller, a mobility management entity, or the like, which is not limited in the embodiments of the disclosure.

It is to be understood that a device with communication function in the network/system in the embodiments of the present disclosure may be referred to as a communication device. Taking the communication system 100 illustrated in FIG. 3 as an example, communication devices may include the network device 110 and the terminal 120 with the communication function. The network device 110 and the terminal 120 may be specific devices mentioned above, and details are not described herein. The communication device may further include another device in the communication system 100, for example, another network entity such as a network controller or a mobility management entity, which is not limited in the embodiments of the present disclosure.

As illustrated in FIG. 4, an optional processing flow of a channel transmission method according to an embodiment of the disclosure is provided and includes the following operation.

At S201, a terminal device determines a target time-frequency resource based on first time-frequency resources for channel transmission and a second time-frequency resource indicated by first indication information. A channel transmission on the target time-frequency resource is cancelled, and the first time-frequency resources include time-frequency resources corresponding to a joint channel estimation and/or time-frequency resources corresponding to a transport block transmission over multiple slots.

In some embodiments, the first indication information may be a UL CI transmitted by a network device. As an example, the second time-frequency resource indicated by the first indication information may be a time-frequency resource for transmission of a URLLC service. Therefore, when the first time-frequency resource for channel transmission conflicts with the second time-frequency resource indicated by the first indication information, the terminal device may cancel transmission of non-URLLC services, to ensure that the URLLC service is transmitted on the second time-frequency resource; as an example, the first time-frequency resources for channel transmission may be time-frequency resources for transmission of the non-URLLC services.

In some embodiments, the target time-frequency resource is a time-frequency resource in the first time-frequency resources corresponding to the cancelled channel transmission.

In some embodiments, the time-frequency resources corresponding to the transport block transmission over multiple slots may refer to time-frequency resources corresponding to X slots when a transmission block is transmitted in the X slots. X is a positive integer greater than 1.

In some embodiments, the channel transmission may refer to channel repetition transmission in at least two slots, and the channel transmission may also refer to transmission of a transmission block in at least two slots. As an example, transmission of a transmission block in at least two slots may be referred to as a Transmission block over Multi-slot (TBoMS), and the TBoMS transmission maps a transmission block to more than two slot for transmission, to enhance transmission coverage. As an example of the TBoMS transmission, as illustrated in FIG. 5, the TBoMS transmission maps a transmission block to 4 slot for transmission.

In some embodiments, the terminal device determines the target time-frequency resource based on the first time-frequency resources and the second time-frequency resource indicated by the first indication information in at least the following modes which are described respectively as follows.

First mode: when a time-frequency resource of an N-th repetition transmission in the time-frequency resources corresponding to the joint channel estimation conflicts with the second time-frequency resource, the terminal device cancels the N-th repetition transmission. N is a positive integer.

In some embodiments, the target time-frequency resource is a time-frequency resource corresponding to the N-th repetition transmission. As an example, the target time-frequency resource includes time-frequency resources corresponding to time-domain positions ranged from a time-domain starting position of a conflicted time-frequency resource to a time-domain position where the N-th repetition transmission ends.

In some embodiments, confliction of the time-frequency resource of the N-th repetition transmission with the second time-frequency resource may be that time-frequency resources of the N-th repetition transmission and the second time-frequency resource include the same time-frequency resources. The same time-frequency resources may be all time-frequency resources of the N-th repetition transmission, or a part of the time-frequency resources of the N-th repetition transmission; and the same time-frequency resources may be all time-frequency resources of the second time-frequency resource, or a part of the time-frequency resources in the second time-frequency resource.

In some embodiments, cancelation of the N-th repetition transmission by the terminal device may be cancelation of repetition transmissions from the time-domain starting position of the conflicted time-frequency resource to the time-domain position where the N-th repetition transmission ends. As an example, the target time-frequency resources are time-domain resources from the time-domain starting position of a conflicted time-frequency resource to the time-domain position where the N-th repetition transmission ends.

Figure 6:
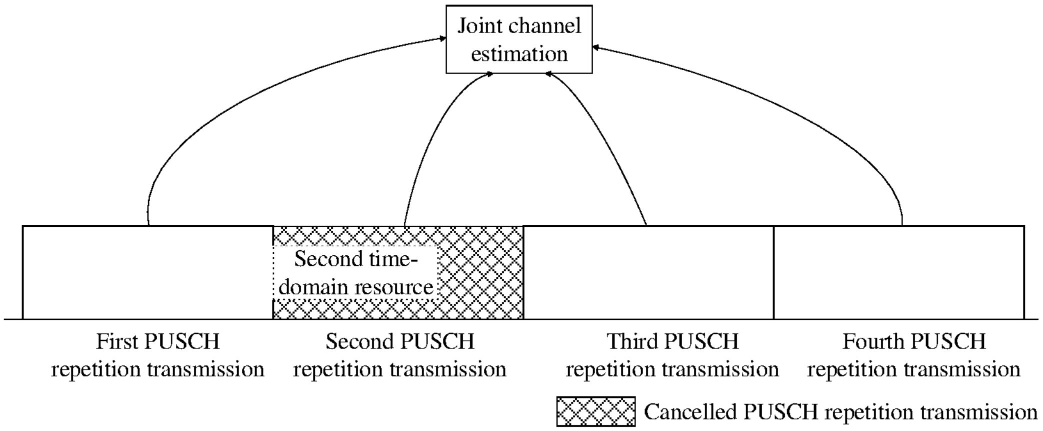
FIG. 6 is an optional schematic diagram of cancelling PUSCH repetition transmission according to an embodiment of the disclosure.

As illustrated in FIG. 6, an optional schematic diagram of cancelling PUSCH repetition transmission is provided, in which a joint channel transmission includes four slots, and the terminal device performs repetition transmissions in four slots. The second time-frequency resource indicated by the first indication information partially overlaps with a second one of four slots corresponding to the joint channel estimation, and the terminal device performs the second PUSCH repetition transmission in the second slot. In this scenario, the terminal device cancels repetition transmissions from the time-domain starting position of the conflicted time-frequency resource to the time-domain position where the second PUSCH repetition transmission ends, rather than only cancelling the repetition transmission corresponding to the conflict time-frequency resource.

In some embodiments, when influence of cancelation of the N-th repetition transmission on performance of the joint channel estimation is within an acceptable range, channel estimation modes used by uncancelled repetition transmissions may be determined according to the time-frequency resource of the N-th repetition transmission. As an example, the channel estimation modes may be determined according to a position of the N-th repetition transmission in the joint channel estimation, and/or a number of N-th repetition transmissions, or the like. As an example, the acceptable range may include: a number of slots corresponding to the joint channel estimation meets a first threshold, and/or the time-frequency resource of the N-th repetition transmission is located at a first time-domain position. As an example, a time-domain unit corresponding to the first time-domain position may include: a first time-domain unit or a last time-domain unit in time-domain units corresponding to the joint channel estimation. Of course, the acceptable range may further include other conditions, which is not limited here.

Still taking FIG. 6 as an example, if the first threshold is 3, in the repetition transmissions illustrated in FIG. 6, after the second repetition transmission is cancelled, there are still three slots for the first repetition transmission, the third repetition transmission and the fourth repetition transmission, while the first threshold of the joint channel estimation is 2, therefore, influence of cancelation of the second repetition transmission on performance of the joint channel estimation is within the acceptable range.

The network device may perform channel estimation on the uncancelled repetition transmissions when influence of cancelation of the repetition transmission on performance of the joint channel estimation is within the acceptable range. Channel estimation modes of the uncancelled repetition transmissions are determined according to the time-frequency resource of the N-th repetition transmission. As an example, the channel estimation modes of the uncancelled repetition transmissions include at least one of: applying the joint channel estimation to the uncancelled repetition transmissions, applying independent channel estimations to the uncancelled repetition transmissions respectively, applying the joint channel estimation to uncancelled repetition transmissions before the cancelled repetition transmissions, or applying the joint channel estimation to uncancelled repetition transmissions after the cancelled repetition transmissions.

Figure 7:
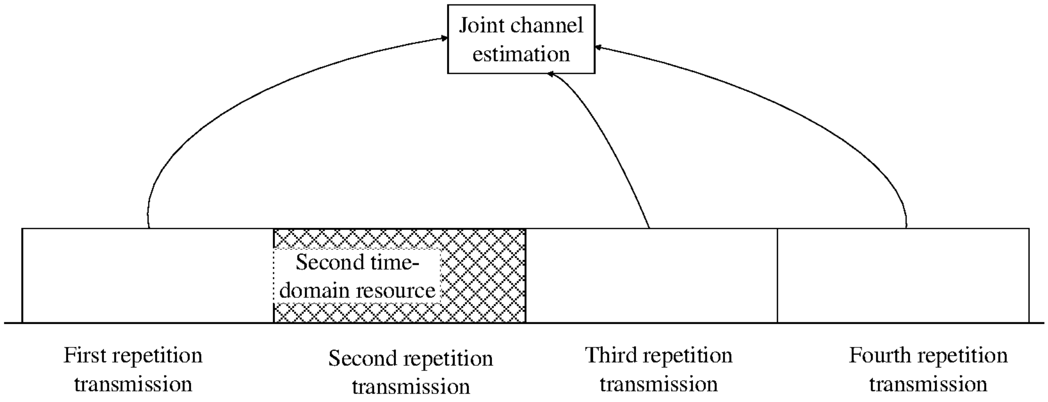
FIG. 7 is an optional schematic diagram of performing channel estimation by a network device according to an embodiment of the disclosure.
Figure 8:
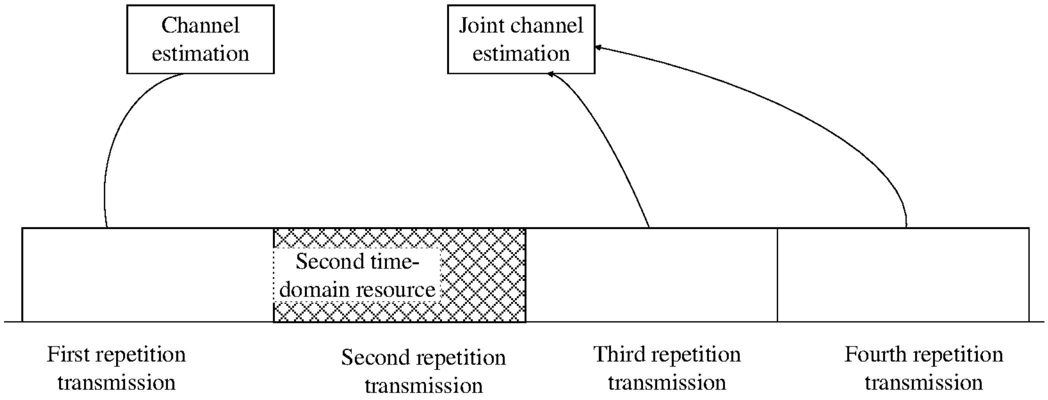
FIG. 8 is another optional schematic diagram of performing channel estimation by a network device according to an embodiment of the disclosure.
Figure 9:
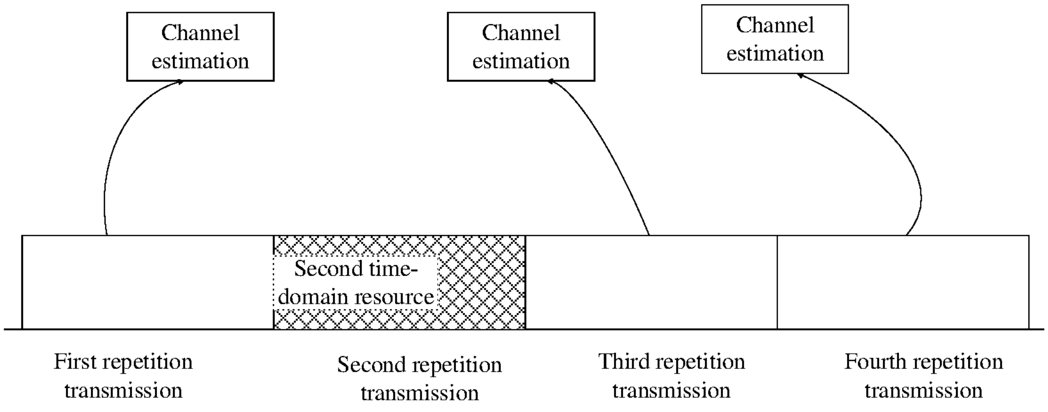
FIG. 9 is another optional schematic diagram of performing channel estimation by a network device according to an embodiment of the disclosure.

Still taking FIG. 6 as an example, when the second repetition transmission is cancelled, an optional schematic diagram of performing channel estimation by a network device is illustrated in FIG. 7, in which the joint channel estimation may be applied to the uncancelled repetition transmissions. As an example, the joint channel estimation is performed on the first repetition transmission, the third repetition transmission and the fourth repetition transmission that are not cancelled. Another optional schematic diagram of performing channel estimation by a network device is illustrated in FIG. 8, in which independent channel estimation may be applied to uncancelled repetition transmissions before the cancelled repetition transmissions, and joint channel estimation may be applied to uncancelled repetition transmissions after the cancelled repetition transmissions. As an example, the independent channel estimation may be applied to the uncancelled first repetition transmission, and the joint channel estimation is applied to the uncancelled third repetition transmission and the uncancelled fourth repetition transmission. Another optional schematic diagram of performing channel estimation by a network device is illustrated in FIG. 9, in which independent channel estimations are applied to the uncancelled repetition transmissions respectively. As an example, independent channel estimation modes are applied to the uncancelled first repetition transmission, the uncancelled third repetition transmission and the uncancelled fourth, respectively.

According to the channel transmission method provided in the embodiments of the disclosure, the repetition transmission from the time-domain starting position of the conflicted time-frequency resource to the time-domain position where the N-th repetition transmission ends is cancelled, rather than cancelling all multi-slot transmissions, such that influence on uplink coverage enhancement in multi-slot transmission may be reduced.

Second mode: when a time-frequency resource of an N-th repetition transmission in the time-frequency resources corresponding to the joint channel estimation conflicts with the second time-frequency resource, the terminal device cancels the N-th repetition transmission and repetition transmissions after the N-th repetition transmission.

In some embodiments, the target time-frequency resource includes time-frequency resources corresponding to the N-th repetition transmission and repetition transmissions after the N-th repetition transmission. As an example, the target time-frequency resource includes time-frequency resources corresponding to time-domain positions ranged from a time-domain starting position of a conflicted time-frequency resource to a time-domain position where the time-frequency resources corresponding to the joint channel estimation end.

In some embodiments, confliction of the time-frequency resource of the N-th repetition transmission with the second time-frequency resource may be that time-frequency resources of the N-th repetition transmission and the second time-frequency resources include the same time-frequency resources. The same time-frequency resources may be all time-frequency resources of the N-th repetition transmission, or a part of the time-frequency resources of the N-th repetition transmission; and the same time-frequency resources may be all time-frequency resources of the second time-frequency resource, or a part of the time-frequency resources in the second time-frequency resource.

In some embodiments, the terminal device cancels the N-th repetition transmission and repetition transmissions after the N-th repetition transmission when influence of cancelation of the N-th repetition transmission on performance of the joint channel estimation is within an unacceptable range. As an example, the unacceptable range may include: a number of slots corresponding to the joint channel estimation is less than a first threshold, and/or the time-frequency resource of the N-th repetition transmission is located at a second time-domain position. As an example, time-domain units corresponding to the second time-domain position may include a non-first time-domain unit and a non-last time-domain unit in time-domain units corresponding to the joint channel estimation. Of course, the unacceptable range may further include other conditions, which is not limited here.

Still taking FIG. 6 as an example, if the first threshold is 4, in the repetition transmissions illustrated in FIG. 6, after the second repetition transmission is cancelled, there are still three slots for the first repetition transmission, the third repetition transmission and the fourth repetition transmission, while the first threshold of the joint channel estimation is 4, therefore, influence of cancelation of the second repetition transmission on performance of the joint channel estimation is within the unacceptable range. In this scenario, the terminal device cancels the second repetition transmission, and the third repetition transmission and the fourth repetition transmission after the second repetition transmission.

In some embodiments, cancelation of the N-th repetition transmission and repetition transmissions after the N-th repetition transmission by the terminal device may be cancelation of all repetition transmissions after the time-domain starting position of the conflicted time-frequency resource.

Figure 10:
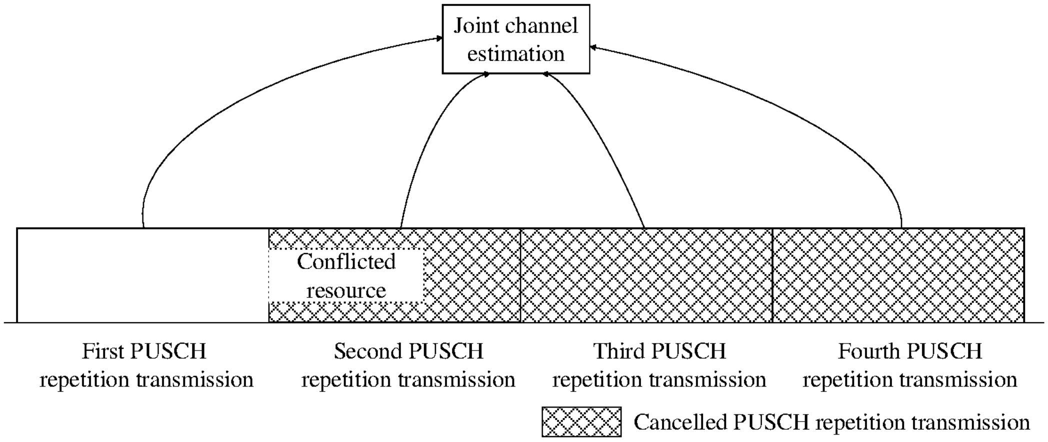
FIG. 10 is another optional schematic diagram of cancelling PUSCH repetition transmission according to an embodiment of the disclosure.

As illustrated in FIG. 10, another optional schematic diagram of cancelling PUSCH repetition transmission is provided, in which a joint channel transmission includes four slots, and the terminal device performs repetition transmissions in four slots. The second time-frequency resource indicated by the first indication information partially overlaps with a second one of four slots corresponding to the joint channel estimation, and the terminal device performs the second PUSCH repetition transmission in the second slot. In this scenario, the terminal device cancels repetition transmissions from the time-domain starting position of the conflicted time-frequency resource to the time-domain position where the fourth PUSCH repetition transmission ends.

For the above first mode and second mode, the channel transmission method may further include the following operation.

At S202, according to a first predefined rule or a first signaling, the terminal device determines to cancel the N-th repetition transmission or cancel the N-th repetition transmission and repetition transmissions after the N-th repetition transmission.

In some embodiments, the terminal device may determine, according to the first predefined rule or the first signaling, to use the repetition transmission cancelation mode provided in the first mode or the second mode.

In some embodiments, the first predefined rule may include a first number threshold of time-domain units for the joint channel estimation in the first time-frequency resources except the target time-frequency resource. As an example, when the number of time-domain units for the joint channel estimation in the first time-frequency resources except the target time-frequency resource is greater than or equal to the first number threshold, the repetition transmission cancelation mode provided in the first mode is used; and when the number of such time-domain units is less than the first number threshold, the repetition transmission cancelation mode provided in the second mode is used.

In some embodiments, the first predefined rule may include a number threshold of time-domain units where channel transmission is cancelled. As an example, when a number of target time-frequency resources is greater than or equal to the number threshold of time-domain units where channel transmission is cancelled, the repetition transmission cancelation mode provided in the second mode is used. When the number of target time-frequency resources is less than the number threshold of time-domain units where channel transmission is cancelled, the repetition transmission cancelation mode provided in the first mode is used.

In some embodiments, the terminal device may determine, according to the first signaling sent by the network device, to use the repetition transmission cancelation mode provided in the first mode or the second mode.

As an example, the first signaling may be at least one of Radio Resource Control (RRC) signaling, Downlink Control Information (DCI), or a Medium Access Control Control element (MAC CE). As an example, the DCI may be DCI for scheduling the PUSCH repetition transmission.

In some embodiments, multi-slot transmissions for the first mode and the second mode may include at least one of PUCCH repetition transmission, PRACH repetition transmission, or PUSCH repetition transmission. The PUSCH repetition transmission may be PUSCH transmission corresponding to Msg3 in two-step random access, or PUSCH transmission corresponding to MsgA in four-step random access.

As an example, when the channel transmission is the PUCCH repetition transmission, the joint channel estimation may be performed by way of DMRS bundling, to improve performance of the channel estimation; correspondingly, the DMRS bundling also corresponds to a time window including at least two time-domain units, and the time-domain unit may be a slot, or a symbol, or a symbol group, or a slot group, or the like. As an example, when the second time-domain resource indicated by the UL CI is partially or completely overlapped with a time-frequency resource of the PUCCH repetition transmission, a part of transmissions in the PUCCH repetition transmission or PUCCH transmissions in a part of slots may be cancelled. In a specific implementation, when a preset condition is met, the part of transmissions in the PUCCH repetition transmission or PUCCH transmissions in the part of slots may be cancelled; and when the preset condition is not met, PUCCH transmission corresponding to the conflicted resource is not cancelled. The preset condition may be that a number of PUCCH repetition transmissions meets a value, and the preset condition may also be other conditions except the number of PUCCH repetition transmissions, which is not limited here.

In some embodiments, the DMRS may be re-bundled according to cancelation of the PUCCH. Specifically, a mode which is the same as or similar to the channel estimation mode of the uncancelled repetition transmissions in the first mode may be used. For example, DMRSs corresponding to uncancelled PUCCH channel transmissions are bundled, or the DMRSs corresponding to the uncancelled PUCCH channel transmissions are not bundled; or DMRSs corresponding to uncancelled PUCCH channel transmissions before a cancelled PUCCH channel transmission are bundled; or DMRSs corresponding to uncancelled PUCCH channel transmissions after the cancelled PUCCH channel transmission are bundled, or other bundling modes.

In some embodiments, the channel transmission may also be PRACH transmission. Modes of the PRACH transmission may be the same as those of the PUSCH transmission.

Third mode: when a third time-frequency resource in the time-frequency resources corresponding to the transport block transmission over multiple slots conflicts with the second time-frequency resource, the terminal device cancels transmission of the transport block transmission over multiple slots in the third time-frequency resource.

In some embodiments, when the third time-frequency resource in the time-frequency resources corresponding to the transport block transmission over multiple slots conflicts with the second time-frequency resource, the target time-frequency resource includes the third time-frequency resource. As an example, the target time-frequency resource includes time-frequency resources corresponding to time-domain positions ranged from a time-domain starting position of a conflicted time-frequency resource to a time-domain position where the transport block transmission over multiple slots in the third time-frequency resource ends.

In some embodiments, confliction of the third time-frequency resource with the second time-frequency resource may be that the third time-frequency resource and the second time-frequency resource include the same time-frequency resources. The same time-frequency resources may be all time-frequency resources of the third time-frequency resource, or a part of the time-frequency resources in the third time-frequency resource; and the same time-frequency resources may be all time-frequency resources of the second time-frequency resource, or a part of the time-frequency resources in the second time-frequency resource.

In some embodiments, when the transport block transmission over multiple slots includes X slots, the third time-frequency resource may be one or more slots of the X slots.

In some embodiments, cancelation of transmission of the transport block transmission over multiple slots in the third time-frequency resource by the terminal device may be that the terminal device cancels transmissions from a time-domain starting position of the conflicted time-frequency resource to a time-domain position where the transport block transmission over multiple slots in the third time-frequency resource ends. In this scenario, cancelation of the transmission of the transport block transmission over multiple slots in the third time-frequency resource has an acceptable influence on demodulating the transmission block by the network device. As an example, the acceptable condition may be that a number of slots for an actual TBoMS transmission meets a second threshold, or a third time-domain unit is located in a third time-domain position in the slots of the TBoMS transmission; as an example, the third time-domain position is not a first slot of the TBoMS transmission. Of course, the acceptable condition may further include other conditions, which is not limited here.

Figure 11:
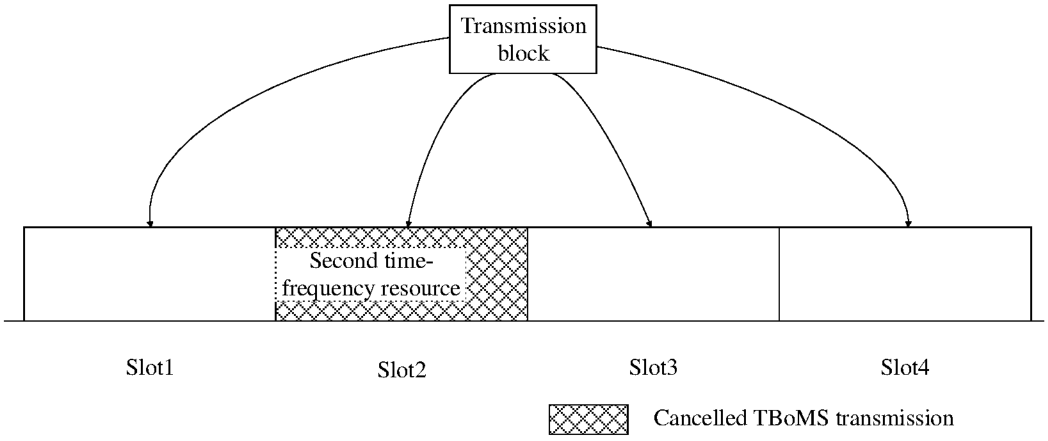
FIG. 11 is an optional schematic diagram of cancelling PUSCH transmission in TBoMS transmission according to an embodiment of the disclosure.

As illustrated in FIG. 11, an optional schematic diagram of cancelling PUSCH transmission in TBoMS transmission is provided, in which the TBoMS transmission includes PUSCH transmissions in slot 1 to slot 4. The second time-frequency resource indicated by the first indication information partially overlaps with the slot 2 in the TBoMS transmission, and if the second threshold is 2, the number of slots for the actual TBoMS transmission is 3 which is greater than the second threshold, and the terminal device cancels PUSCH transmission in the slot 2, and does not cancel PUSCH transmissions in the slot 1, the slot 3 and the slot 4.

In some embodiments, the terminal device may determine a transmission mode of the transport block transmission over multiple slots according to the third time-frequency resource.

In some embodiments, the terminal device may determine a mapping mode of the transmission block according to a position of the third time-frequency resource in the TBoMS transmission, and/or a number of third time-frequency resources.

In some embodiments, when a time interval between the time at which the terminal device receives the first indication information and the time at which the TBoMS transmission starts may be used by the terminal device to map the transmission block, the terminal device may determine the transmission mode of the transmission block according to the third time-frequency resource.

Figure 12:
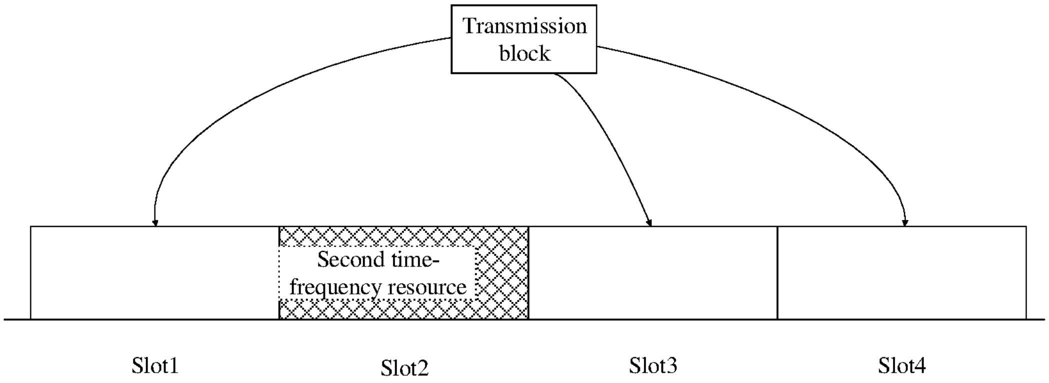
FIG. 12 is an optional schematic diagram of determining a transmission mode of a transport block transmission over multiple slots by a terminal device according to an embodiment of the disclosure.
Figure 13:
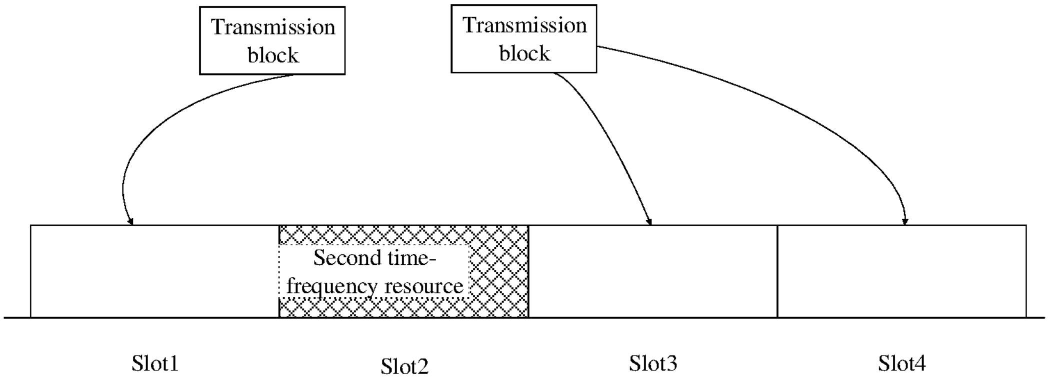
FIG. 13 is another optional schematic diagram of determining a transmission mode of a transport block transmission over multiple slots by a terminal device according to an embodiment of the disclosure.

In some embodiments, the transmission block is mapped to all time-domain units except the third time-frequency resource to perform the transport block transmission over multiple slots. In case of the scenario illustrated in FIG. 11, FIG. 12 illustrates an optional schematic diagram of determining a transmission mode of the transmission block by the terminal device, in which the transmission block is mapped to all time-domain units (slot 1, slot 3 and slot 4) except the third time-frequency resource (slot 2). In case of the scenario illustrated in FIG. 11, FIG. 13 illustrates another optional schematic diagram of determining a transmission mode of the transport block transmission over multiple slots by the terminal device, in which the transmission block is mapped to a time-domain unit (slot 1) except the third time-frequency resource for transmission, and the transmission block is mapped to at least two time-domain units (slot 3 and slot 4) except the third time-frequency resource for transmission. As an example, mapping of the transmission block to the slot 1 for transmission is used as a first repetition transmission of the transmission block; and mapping of the transmission block to the slot 3 and the slot 4 for TBoMS transmission is used as a second repetition transmission of the transmission block.

According to the channel transmission method provided in the embodiments of the disclosure, transmission of the transport block transmission over multiple slots in the third time-frequency resource is cancelled, rather than cancelling all TBoMS transmissions, such that influence on uplink coverage enhancement in the TBoMS transmission may be reduced.

Fourth mode: when a third time-frequency resource in the time-frequency resources corresponding to the transport block transmission over multiple slots conflicts with the second time-frequency resource, the terminal device cancels transmission of the transport block transmission over multiple slots in the third time-frequency resource, and transmissions after the third time-frequency resource in the time-frequency resources corresponding to the transport block transmission over multiple slots. The third time-frequency resource is a part or all of time-frequency resources in the first time-frequency resource.

In some embodiments, when the third time-frequency resource in the time-frequency resources corresponding to the transport block transmission over multiple slots conflicts with the second time-frequency resource, the target time-frequency resource includes the third time-frequency resource and time-frequency resources after the third time-frequency resource. As an example, the target time-frequency resource includes time-frequency resources after a time-domain starting position of the conflicted time-frequency resource.

Figure 14:
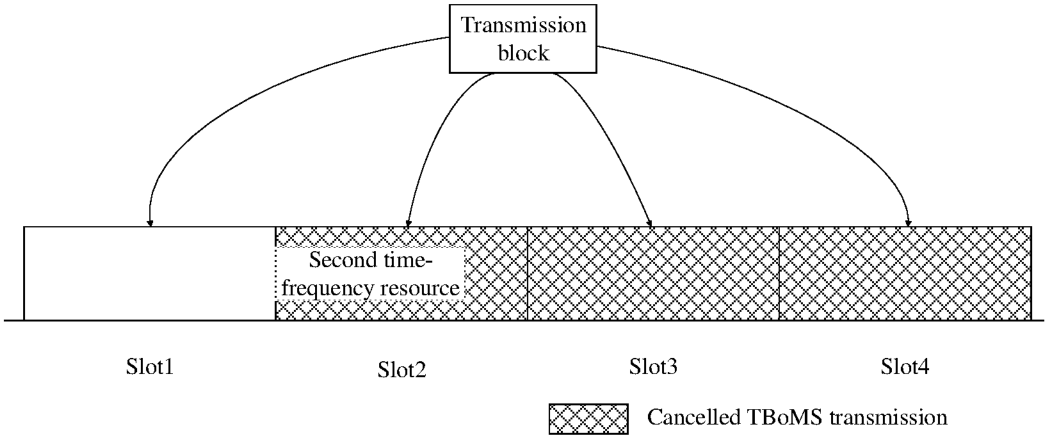
FIG. 14 is another optional schematic diagram of cancelling PUSCH transmission in TBoMS transmission according to an embodiment of the disclosure.

In some embodiments, the terminal device cancels transmissions from a time-domain starting position of the conflicted time-frequency resource to a time-domain position where the transport block transmission over multiple slots in the third time-frequency resource ends, and transmissions after the third time-frequency resource. As an example, the terminal device cancels all transmissions after the time-domain starting position of the conflicted time-frequency resource. In this scenario, influence of cancelation of the transmission of the transport block transmission over multiple slots in the third time-frequency resource on demodulating the transmission block by the network device is unacceptable. As an example, the unacceptable condition may be that a number of slots for an actual TBoMS transmission is less than a third threshold, or a third time-domain unit is located in a fourth time-domain position in the slots of the TBoMS transmission; as an example, the fourth time-domain position is a first slot of the TBoMS transmission. Of course, the unacceptable condition may further include other conditions, which is not limited here. As illustrated in FIG. 14, another optional schematic diagram of cancelling PUSCH transmission in TBoMS transmission is provided, in which the TBoMS transmission includes PUSCH transmissions in slot 1 to slot 4. The second time-frequency resource indicated by the first indication information partially overlaps with the slot 2 in the TBoMS transmission, and if the second threshold is 4, the number of slots for the actual TBoMS transmission is 3 which is less than the second threshold, then the terminal device cancels PUSCH transmissions in the slot 2, the slot 3 and the slot 4.

For the above third mode and fourth mode, the channel transmission method may further include the following operation.

At S203, according to a second predefined rule or a second signaling, the terminal device determines to cancel transmission of the transport block transmission over multiple slots in the third time-frequency resource or cancel transmissions of the transport block transmission over multiple slots in and after the third time-frequency resource.

In some embodiments, the terminal device may determine, according to the second predefined rule or the second signaling, to use the repetition transmission cancelation mode provided in the third mode or the fourth mode.

In some embodiments, the second predefined rule may include a second number threshold of time-domain units for the transport block transmission over multiple slots in the first time-frequency resources except the target time-frequency resource. As an example, when a number of time-domain units for the transport block transmission over multiple slots in the first time-frequency resources except the target time-frequency resource is greater than or equal to the second number threshold, the repetition transmission cancelation mode provided in the third mode is used; and when the number of time-domain units for the transport block transmission over multiple slots in the first time-frequency resources except the target time-frequency resource is less than the second number threshold, the repetition transmission cancelation mode provided in the fourth mode is used.

In some embodiments, the second predefined rule may include a number threshold of time-domain units cancelled in the transport block transmission over multiple slots. As an example, when a number of target time-frequency resources is greater than or equal to the number threshold of time-domain units cancelled in the transport block transmission over multiple slots, the repetition transmission cancelation mode provided in the fourth mode is used. When the number of target time-frequency resources is less than the number threshold of time-domain units cancelled in the transport block transmission over multiple slots, the repetition transmission cancelation mode provided in the third mode is used.

In some embodiments, the terminal device may determine, according to the second signaling sent by the network device, usage of the repetition transmission cancelation mode provided in the third mode or the fourth mode.

As an example, the second signaling may be at least one of RRC signaling, DCI, or a MAC CE. As an example, the DCI may be DCI for scheduling the TBoMS.

In some embodiments, channel transmissions for the third mode and the fourth mode may include PUSCH repetition transmission. The PUSCH repetition transmission may be PUSCH transmission corresponding to Msg3 in two-step random access, or PUSCH transmission corresponding to MsgA in four-step random access.

Figure 15:
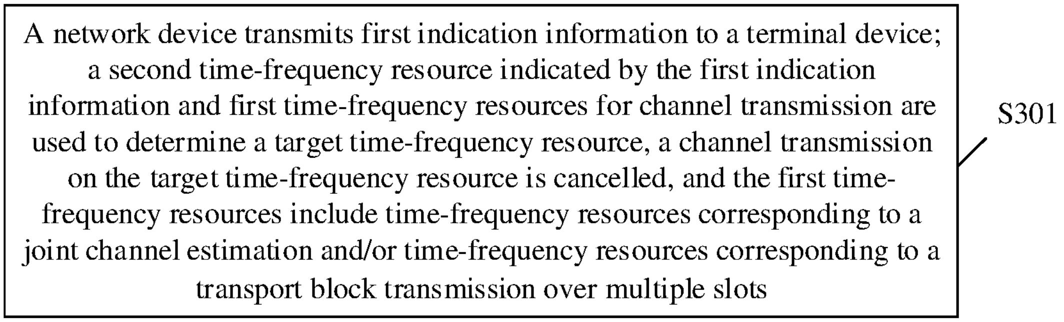
FIG. 15 is another optional processing flowchart of a channel transmission method according to an embodiment of the disclosure.

As illustrated in FIG. 15, another optional processing flow of a channel transmission method according to an embodiment of the disclosure is provided and includes the following operation.

At S301, a network device transmits first indication information to a terminal device. A second time-frequency resource indicated by the first indication information and first time-frequency resources for channel transmission are used to determine a target time-frequency resource, a channel transmission on the target time-frequency resource is cancelled, and the first time-frequency resources include time-frequency resources corresponding to a joint channel estimation and/or time-frequency resources corresponding to a transport block transmission over multiple slots.

In some embodiments, descriptions of the first indication information and descriptions of determining time-frequency resources for the multi-slot transmission based on the first time-frequency resources and the second time-frequency resource are the same as descriptions of the first indication information and descriptions of determining time-frequency resources for the multi-slot transmission based on the first time-frequency resources and the second time-frequency resource in S201, which are not elaborated here.

In the embodiments of the disclosure, the terminal device may determine the time-frequency resources for the multi-slot transmission based on the first time-frequency resources and the second time-frequency resource.

According to the channel transmission method provided in the embodiments of the disclosure, when time-frequency resources (such as time-frequency resources for channel repetition transmission or time-frequency resources for the transport block transmission over multiple slots) for the multi-slot transmission conflict with time-frequency resources for the URLLC service transmission, normal transmission of the URLLC service may be implemented by cancelling a part or all of channel transmissions on the time-frequency resources for the multi-slot transmission, thereby reducing influence on coverage enhancement in the multi-slot transmission.

Figure 16:
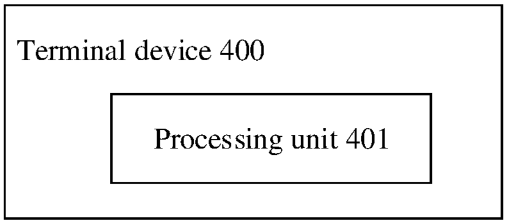
FIG. 16 is a schematic structural diagram of optional composition of a terminal device according to an embodiment of the disclosure.

In order to implement the channel transmission methods provided in the embodiments of the disclosure, the embodiments of the disclosure further provide a terminal device. FIG. 16 illustrates an optional composition structure of a terminal device 400, and the terminal device 400 includes a processing unit 401.

The processing unit 401 is configured to determine a target time-frequency resource based on first time-frequency resources for channel transmission and a second time-frequency resource indicated by first indication information.

A channel transmission on the target time-frequency resource is cancelled, and the first time-frequency resources include time-frequency resources corresponding to a joint channel estimation and/or time-frequency resources corresponding to a transport block transmission over multiple slots.

In some embodiments, when a time-frequency resource of an N-th repetition transmission in the time-frequency resources corresponding to the joint channel estimation conflicts with the second time-frequency resource, the target time-frequency resource includes the time-frequency resource corresponding to the N-th repetition transmission.

In some embodiments, the target time-frequency resource includes time-frequency resources corresponding to time-domain positions ranged from a time-domain starting position of a conflicted time-frequency resource to a time-domain position where the N-th repetition transmission ends.

In some embodiments, a repetition transmission on the target time-frequency resource is cancelled, and channel estimation modes of uncancelled repetition transmissions are determined according to the time-frequency resource of the N-th repetition transmission.

In some embodiments, the channel estimation modes of the uncancelled repetition transmissions include at least one of: applying the joint channel estimation to the uncancelled repetition transmissions; applying independent channel estimations to the uncancelled repetition transmissions, respectively; applying the joint channel estimation to uncancelled repetition transmissions before the cancelled repetition transmissions; or, applying the joint channel estimation to uncancelled repetition transmissions after the cancelled repetition transmissions.

In some embodiments, when a time-frequency resource of an N-th repetition transmission in the time-frequency resources corresponding to the joint channel estimation conflicts with the second time-frequency resource, the target time-frequency resource includes time-frequency resources corresponding to the N-th repetition transmission and repetition transmissions after the N-th repetition transmission.

In some embodiments, the target time-frequency resource includes time-frequency resources corresponding to time-domain positions ranged from a time-domain starting position of a conflicted time-frequency resource to a time-domain position where the time-frequency resources corresponding to the joint channel estimation end.

In some embodiments, the processing unit 401 is configured to determine, according to a first predefined rule or a first signaling, to cancel the N-th repetition transmission or cancel the N-th repetition transmission and repetition transmissions after the N-th repetition transmission.

In some embodiments, the first predefined rule includes a first number threshold of time-domain units for the joint channel estimation in the first time-frequency resources except the target time-frequency resource.

In some embodiments, the first signaling includes at least one of RRC signaling, DCI, or a MAC CE.

In some embodiments, the channel transmission includes at least one of PUCCH repetition transmission or PRACH repetition transmission.

In some embodiments, when a third time-frequency resource in the time-frequency resources corresponding to the transport block transmission over multiple slots conflicts with the second time-frequency resource, the target time-frequency resource include the third time-frequency resource.

In some embodiments, the target time-frequency resource includes time-frequency resources corresponding to time-domain positions ranged from a time-domain starting position of a conflicted time-frequency resource to a time-domain position where the transport block transmission over multiple slots in the third time-frequency resource ends.

In some embodiments, the processing unit 401 is further configured to determine a transmission mode of the transport block transmission over multiple slots according to the third time-frequency resource.

In some embodiments, the transmission mode of the transport block transmission over multiple slots includes mapping a transmission block to all time-domain units except the third time-frequency resource to perform the transport block transmission over multiple slots.

In some embodiments, the transmission mode of the transport block transmission over multiple slots includes at least one of: mapping a transmission block to a time-domain unit except the third time-frequency resource for transmission; or, mapping the transmission block to at least two time-domain units except the third time-frequency resource to perform the transport block transmission over multiple slots.

In some embodiments, when a third time-frequency resource in the time-frequency resources corresponding to the transport block transmission over multiple slots conflicts with the second time-frequency resource, the target time-frequency resource includes the third time-frequency resource and time-frequency resources after the third time-frequency resource of the transport block transmission over multiple slots.

In some embodiments, the processing unit 401 is further configured to determine to cancel transmission of the transport block transmission over multiple slots in the third time-frequency resource or cancel transmissions in and after the third time-frequency resource according to a second predefined rule or a second signaling.

In some embodiments, the second predefined rule includes a second number threshold of time-domain units for the transport block transmission over multiple slots in the first time-frequency resources except the target time-frequency resource.

In some embodiments, the second signaling includes at least one of RRC signaling, DCI, or a MAC CE.

In some embodiments, the channel transmission includes PUSCH transmission.

In some embodiments, the PUSCH transmission includes at least one of PUSCH transmission corresponding to Msg3 in two-step random access, or PUSCH transmission corresponding to MsgA in four-step random access.

In some embodiments, the first indication information includes a UL CI.

Figure 17:
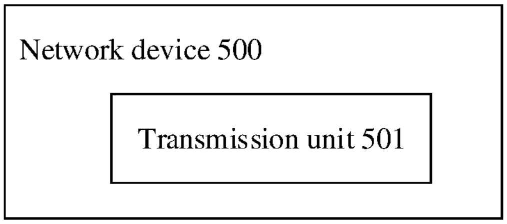
FIG. 17 is a schematic structural diagram of optional composition of a network device according to an embodiment of the disclosure.

In order to implement the channel transmission methods provided in the embodiments of the disclosure, the embodiments of the disclosure further provide a network device. FIG. 17 illustrates an optional composition structure of a network device 500, and the network device 500 includes a transmission unit 501.

The transmission unit 501 is configured to transmit first indication information to a terminal device.

A second time-frequency resource indicated by the first indication information and first time-frequency resources for channel transmission are used to determine a target time-frequency resource, a channel transmission on the target time-frequency resource is cancelled, and the first time-frequency resources include time-frequency resources corresponding to a joint channel estimation and/or time-frequency resources corresponding to a transport block transmission over multiple slots.

In some embodiments, when a time-frequency resource of an N-th repetition transmission in the time-frequency resources corresponding to the joint channel estimation conflicts with the second time-frequency resource, the target time-frequency resource includes the time-frequency resource corresponding to the N-th repetition transmission.

In some embodiments, the target time-frequency resource includes time-frequency resources corresponding to time-domain positions ranged from a time-domain starting position of a conflicted time-frequency resource to a time-domain position where the N-th repetition transmission ends.

In some embodiments, a repetition transmission on the target time-frequency resource is cancelled, and channel estimation modes of uncancelled repetition transmissions are determined according to the time-frequency resource of the N-th repetition transmission.

In some embodiments, the channel estimation modes used by the uncancelled repetition transmissions include at least one of: applying the joint channel estimation to the uncancelled repetition transmissions; applying independent channel estimations to the uncancelled repetition transmissions, respectively; applying the joint channel estimation to uncancelled repetition transmissions before the cancelled repetition transmissions; or, applying the joint channel estimation to uncancelled repetition transmissions after the cancelled repetition transmissions.

In some embodiments, when a time-frequency resource of an N-th repetition transmission in the time-frequency resources corresponding to the joint channel estimation conflicts with the second time-frequency resource, the target time-frequency resource includes time-frequency resources corresponding to the N-th repetition transmission and repetition transmissions after the N-th repetition transmission.

In some embodiments, the target time-frequency resource includes time-frequency resources corresponding to time-domain positions ranged from a time-domain starting position of a conflicted time-frequency resource to a time-domain position where the time-frequency resources corresponding to the joint channel estimation end.

In some embodiments, cancelation of the N-th repetition transmission or cancelation of the N-th repetition transmission and repetition transmissions after the N-th repetition transmission is determined according to a first predefined rule or a first signaling.

In some embodiments, the first predefined rule includes a first number threshold of time-domain units for the joint channel estimation in the first time-frequency resources except the target time-frequency resource.

In some embodiments, the first signaling includes at least one of RRC signaling, DCI, or a MAC CE.

In some embodiments, the channel transmission includes at least one of PUCCH repetition transmission or PRACH repetition transmission.

In some embodiments, when a third time-frequency resource in the time-frequency resources corresponding to the transport block transmission over multiple slots conflicts with the second time-frequency resource, the target time-frequency resource includes the third time-frequency resource.

In some embodiments, the target time-frequency resource includes time-frequency resources corresponding to time-domain positions ranged from a time-domain starting position of a conflicted time-frequency resource to a time-domain position where the transport block transmission over multiple slots in the third time-frequency resource ends.

In some embodiments, a transmission mode of the transport block transmission over multiple slots is determined according to the third time-frequency resource.

In some embodiments, the transmission mode of the transport block transmission over multiple slots includes mapping a transmission block to all time-domain units except the third time-frequency resource to perform the transport block transmission over multiple slots.

In some embodiments, the transmission mode of the transport block transmission over multiple slots includes at least one of: mapping a transmission block to a time-domain unit except the third time-frequency resource for transmission; or, mapping the transmission block to at least two time-domain units except the third time-frequency resource to perform the transport block transmission over multiple slots.

In some embodiments, when a third time-frequency resource in the time-frequency resources corresponding to the transport block transmission over multiple slots conflicts with the second time-frequency resource, the target time-frequency resource includes the third time-frequency resource and time-frequency resources after the third time-frequency resource.

In some embodiments, cancelation of transmission of the transport block transmission over multiple slots in the third time-frequency resource or cancelation of transmissions of the transport block transmission over multiple slots in and after the third time-frequency resource is determined according to a second predefined rule or a second signaling.

In some embodiments, the second predefined rule includes a second number threshold of time-domain units for the transport block transmission over multiple slots in the first time-frequency resources except the target time-frequency resource.

In some embodiments, the second signaling includes at least one of RRC signaling, DCI, or a MAC CE.

In some embodiments, the channel transmission includes PUSCH transmission.

In some embodiments, the PUSCH transmission includes at least one of PUSCH transmission corresponding to Msg3 in two-step random access, or PUSCH transmission corresponding to MsgA in four-step random access.

In some embodiments, the first indication information includes a UL CI.

The embodiments of the disclosure further provide a terminal device, including a processor and a memory configured to store a computer program executable on the processor. The processor is configured to run the computer program to execute operations of the above channel transmission method executed by the terminal device.

The embodiments of the disclosure further provide a network device, including a processor and a memory configured to store a computer program executable on the processor. The processor is configured to run the computer program to execute operations of the above channel transmission method executed by the network device.

The embodiments of the disclosure further provide a chip, including a processor. The processor is configured to call and run a computer program from a memory, to enable a device installed with the chip to execute the above channel transmission method executed by the terminal device.

The embodiments of the disclosure further provide a chip, including a processor. The processor is configured to call and run a computer program from a memory, to enable a device installed with the chip to execute the above channel transmission method executed by the network device.

The embodiments of the disclosure further provide a storage medium, having stored thereon an executable program. The executable program, when executed by a processor, implements the above channel transmission method executed by the terminal device.

The embodiments of the disclosure further provide a storage medium, having stored thereon an executable program. The executable program, when executed by a processor, implements the above channel transmission method executed by the network device.

The embodiments of the disclosure further provide a computer program product, including computer program instructions. The computer program instructions enable a computer to execute the above channel transmission method executed by the terminal device.

The embodiments of the disclosure further provide a computer program product, including computer program instructions. The computer program instructions enable a computer to execute the above channel transmission method executed by the network device.

The embodiments of the disclosure further provide a computer program. The computer program enables a computer to execute the above channel transmission method executed by the terminal device.

The embodiments of the disclosure further provide a computer program. The computer program enables a computer to execute the above channel transmission method executed by the network device.

Figure 18:
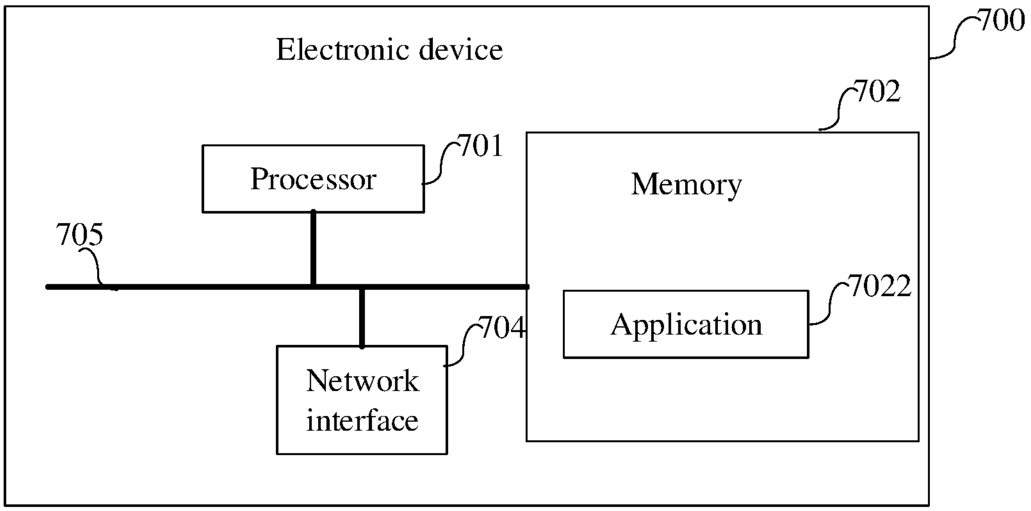
FIG. 18 is a schematic structural diagram of hardware composition of an electronic device according to an embodiment of the disclosure.

FIG. 18 is a schematic structural diagram of hardware composition of an electronic device (a terminal device or a network device) according to an embodiment of the disclosure. The electronic device 700 includes at least one processor 701, a memory 702 and at least one network interface 704. Various components in the electronic device 700 are coupled together by a bus system 705. It may be understood that the bus system 705 is configured to implement connection communication between these components. In addition to a data bus, the bus system 705 further includes a power bus, a control bus and a state signal bus. However, for clarity of illustration, various buses in FIG. 18 are marked as the bus system 705.

It may be understood that the memory 702 may be a volatile memory or a non-volatile memory, or may include both the volatile and non-volatile memories. The non-volatile memory may be a Read-Only Memory (ROM), a Programmable ROM (PROM), an Erasable PROM (EPROM), an Electrically EPROM (EEPROM), a Ferromagnetic Random Access Memory (FRAM), a flash memory, a magnetic surface memory, an optical disc, or a Compact Disc Read-Only Memory (CD-ROM); and the magnetic surface memory may be a magnetic disk memory or a magnetic tape memory. The volatile memory may be a Random Access Memory (RAM) used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory described in the embodiments of the disclosure is intended to include, but not limited to, memories of these and any other proper types.

The memory 702 in the embodiment of the disclosure is configured to store various types of data to support operations of the electronic device 700. Examples of these data include any computer program intended to be operated on the electronic device 700, such as an application 7022. Programs implementing the methods according to the embodiments of the disclosure may be included in the application 7022.

The methods disclosed in the embodiments of the disclosure may be applied to the processor 701, or may be implemented by the processor 701. The processor 701 may be an integrated circuit (IC) chip with signal processing capability. During implementation, operations of the above methods may be completed by an integrated logic circuit in form of hardware in the processor 701 or instructions in form of software. The processor 701 may be a general-purpose processor, a Digital Signal Processor (DSP), or other programmable logical devices, a discrete gate or a transistor logical device, a discrete hardware component, or the like. The processor 701 may implement or execute the methods, operations, and logical block diagrams disclosed in the embodiments of the disclosure. The general-purpose processor may be a microprocessor, or any conventional processor, or the like. Operations of the methods disclosed in combination with the embodiments of the disclosure may be directly embodied as being executed and completed by a hardware decoding processor, or executed and completed by a combination of hardware and software modules in the decoding processor. The software module may be in a storage medium. The storage medium is in the memory 702. The processor 701 reads information in the memory 702, and completes operations of the above methods in combination with hardware of the processor 701.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), Field Programmable Gate Arrays (FPGAs), general-purpose processors, controllers, Micro-Controller Units (MCUs), Micro-Processor Units (MPUs), or other electronic components, and is configured to perform the above methods.

The disclosure is described with reference to flowcharts and/or block diagrams of the method, device (system) and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so as to generate a device for realizing a function specified in one flow or multiple flows in the flowcharts and/or one block or multiple blocks in the block diagrams through the instructions executed through the computer or the processor of another programmable data processing device.

These computer program instructions may also be stored in a computer-readable memory capable of guiding the computer or another programmable data processing device to operate in a specific manner, so as to generate a product including an instruction device by the instructions stored in the computer-readable memory. The instruction device realizes the function specified in one flow or multiple flows in the flowcharts and/or one block or multiple blocks in the block diagrams.

These computer program instructions may further be loaded onto the computer or the other programmable data processing device, so that a series of operations are executed on the computer or the other programmable data processing device to generate computer-implemented processing, and operations for realizing the function specified in one flow or multiple flows in the flowcharts and/or one block or multiple blocks in the block diagrams are provided by the instructions executed on the computer or the other programmable device.

It is to be understood that terms "system" and "network" may usually be exchanged herein. The term "and/or" is only an association relationship describing associated objects, and represents that there are three relationships. For example, A and/or B may represent: independent existence of A, existence of both A and B, and independent existence of B. The character "/" in the disclosure usually represents that previous and next associated objects form an "or" relationship.

The foregoing are only preferred embodiments of the disclosure, and are not intended to limit the scope of protection of the disclosure. Any modification, equivalent replacement, improvement, or the like made within the spirit and principle of the disclosure should be included in the scope of protection of the disclosure.

What is claimed is:

1. A channel transmission method, comprising:

determining, by a terminal device, a target time-frequency resource based on first time-frequency resources for channel transmission and a second time-frequency resource indicated by first indication information, a channel transmission on the target time-frequency resource being cancelled, and the first time-frequency resources comprising time-frequency resources corresponding to a joint channel estimation and/or time-frequency resources corresponding to a transport block transmission over multiple slots;

wherein when a time-frequency resource of an N-th repetition transmission in the time-frequency resources corresponding to the joint channel estimation conflicts with the second time-frequency resource, the target time-frequency resource comprises time-frequency resources corresponding to time-domain positions ranged from a time-domain starting position of a conflicted time-frequency resource to a time-domain position where the N-th repetition transmission ends.

2. The method of claim 1, wherein a repetition transmission on the target time-frequency resource is cancelled, and channel estimation modes of uncancelled repetition transmissions are determined according to the time-frequency resource of the N-th repetition transmission.

3. The method of claim 2, wherein the channel estimation modes of the uncancelled repetition transmissions comprise at least one of:

applying the joint channel estimation to the uncancelled repetition transmissions;

applying independent channel estimations to the uncancelled repetition transmissions, respectively;

applying the joint channel estimation to uncancelled repetition transmissions before the cancelled repetition transmissions; or applying the joint channel estimation to uncancelled repetition transmissions after the cancelled repetition transmissions.

4. The method of claim 1, wherein the channel transmission comprises at least one of a Physical Uplink Control Channel (PUCCH) repetition transmission or a Physical Random Access Channel (PRACH) repetition transmission.

5. The method of claim 1, wherein the channel transmission comprises a Physical Uplink Shared Channel (PUSCH) transmission.

6. The method of claim 1, wherein the first indication information comprises an uplink cancelation indication (UL CI).

7. A terminal device, comprising:

a processor, configured to determine a target time-frequency resource based on first time- frequency resources for channel transmission and a second time-frequency resource indicated by first indication information, a channel transmission on the target time-frequency resource being cancelled, and the first time-frequency resources comprising time-frequency resources corresponding to a joint channel estimation and/or time-frequency resources corresponding to a transport block transmission over multiple slots;

wherein when a time-frequency resource of an N-th repetition transmission in the time- frequency resources corresponding to the joint channel estimation conflicts with the second time-frequency resource, the target time-frequency resource comprises time-frequency resources corresponding to time-domain positions ranged from a time-domain starting position of a conflicted time-frequency resource to a time-domain position where the N-th repetition transmission ends.

8. The terminal device of claim 7, wherein a repetition transmission on the target time-frequency resource is cancelled, and channel estimation modes of uncancelled repetition transmissions are determined according to the time-frequency resource of the N-th repetition transmission.

9. The terminal device of claim 8, wherein the channel estimation modes of the uncancelled repetition transmissions comprise at least one of:

applying the joint channel estimation to the uncancelled repetition transmissions;

applying independent channel estimations to the uncancelled repetition transmissions, respectively;

applying the joint channel estimation to uncancelled repetition transmissions before the cancelled repetition transmissions; or applying the joint channel estimation to uncancelled repetition transmissions after the cancelled repetition transmissions.

10. The terminal device of claim 7, wherein the channel transmission comprises at least one of a Physical Uplink Control Channel (PUCCH) repetition transmission or a Physical Random Access Channel (PRACH) repetition transmission.

11. The terminal device of claim 7, wherein the channel transmission comprises a Physical Uplink Shared Channel (PUSCH) transmission.

12. The terminal device of claim 7, wherein the first indication information comprises an uplink cancelation indication (UL CI).

13. A network device, comprising:

a transmitter, configured to transmit first indication information to a terminal device, a second time-frequency resource indicated by the first indication information and first time-frequency resources for channel transmission being used to determine a target time-frequency resource, wherein a channel transmission on the target time-frequency resource is cancelled, and the first time-frequency resources comprise time-frequency resources corresponding to a joint channel estimation and/or time-frequency resources corresponding to a transport block transmission over multiple slots;

wherein when a time-frequency resource of an N-th repetition transmission in the time-frequency resources corresponding to the joint channel estimation conflicts with the second time-frequency resource, the target time-frequency resource comprises time-frequency resources corresponding to time-domain positions ranged from a time-domain starting position of a conflicted time-frequency resource to a time-domain position where the N-th repetition transmission ends.

14. The network device of claim 13, wherein a repetition transmission on the target time-frequency resource is cancelled, and channel estimation modes of uncancelled repetition transmissions are determined according to the time-frequency resource of the N-th repetition transmission.

* * * * *